United States Patent
Furukoshi et al.

(10) Patent No.: US 8,391,183 B2
(45) Date of Patent: Mar. 5, 2013

(54) SYSTEM AND METHOD FOR OPERATING A LARGE-SCALE WIRELESS NETWORK

(75) Inventors: Akinori Furukoshi, Calgary (CA); Mikel Damke, Calgary (CA)

(73) Assignee: XFEER Corporation, Calgary (CA)

( * ) Notice: Subject to any disclaimer, the term of this patent is extended or adjusted under 35 U.S.C. 154(b) by 1281 days.

(21) Appl. No.: 12/100,849

(22) Filed: Apr. 10, 2008

(65) Prior Publication Data
US 2008/0186902 A1 Aug. 7, 2008

Related U.S. Application Data

(63) Continuation-in-part of application No. PCT/CA2006/001067, filed on Jun. 23, 2006.

(30) Foreign Application Priority Data

Oct. 11, 2005 (CA) ..................................... 2521740

(51) Int. Cl.
*H04L 12/28* (2006.01)
(52) U.S. Cl. ....................................... 370/255; 370/238
(58) Field of Classification Search .................. 370/255, 370/256
See application file for complete search history.

(56) References Cited

U.S. PATENT DOCUMENTS

| | | | |
|---|---|---|---|
| 5,115,433 A | 5/1992 | Baran et al. | |
| 5,861,844 A * | 1/1999 | Gilmore et al. | 342/374 |
| 6,553,218 B1 | 4/2003 | Boesjes | |
| 6,564,261 B1 * | 5/2003 | Gudjonsson et al. | 709/227 |
| 7,327,683 B2 | 2/2008 | Ogier et al. | |
| 7,933,247 B2 * | 4/2011 | Gidwani | 370/332 |
| 2003/0117966 A1 * | 6/2003 | Chen | 370/255 |
| 2003/0179742 A1 | 9/2003 | Ogier et al. | |
| 2007/0082674 A1 * | 4/2007 | Pedersen et al. | 455/450 |

FOREIGN PATENT DOCUMENTS

| | | |
|---|---|---|
| CA | 2 426 769 A1 | 5/2002 |
| CA | 2 511 368 A1 | 5/2002 |
| CA | 2521740 A1 | 4/2007 |

* cited by examiner

*Primary Examiner* — Mark Rinehart
*Assistant Examiner* — Matthew Hopkins
(74) *Attorney, Agent, or Firm* — Seed IP Law Group PLLC

(57) ABSTRACT

There is described an inventive system and method for reducing route computational work load by restricting the routing calculation to a local portion of the data path based on the consideration of the location of those member devices within the same cell, each of which wireless member units is operably connected to form a large-scale wireless communication network.

17 Claims, 11 Drawing Sheets

SYSTEM AND METHOD FOR OPERATING A LARGE-SCALE WIRELESS NETWORK

CROSS-REFERENCE TO RELATED APPLICATIONS

This application is a continuation-in-part of International Application No. PCT/CA2006/001067, filed Jun. 23, 2006, which in turn claims priority from Canadian patent 2521740, filed Oct. 11, 2005. These applications are incorporated herein by reference in their entireties.

TECHNICAL FIELD

The present disclosure relates generally to wireless telecommunication; and more particularly but not exclusively to: apparatus, systems, and methods of distributing routing computational work over multiple processors, while operating a secure wireless communication network, to reduce the local workload of data routing calculations that control and improve the data processing capacity of such network.

BACKGROUND INFORMATION

Wireless communication is growing to cover large areas, but data transfer speed in conventional wireless communication systems is still much slower than wire based communication systems. Canadian patents CA 2426769 and CA 2511368, and U.S. Pat. No. 6,553,218 to Boesjes describe a single unit to handle all routing computations, which can handle the computation workload when the wireless network is deployed over a small area. An example of Boesjes configuration is connecting several end users to the Internet backbone. Disadvantageously, when deployed over a larger area having a larger number of wireless units, the Boesjes single computational unit approach becomes slow because the number of routing computations becomes too voluminous for a single wireless unit to handle alone.

Disadvantageously, Boesjes does not describe any storing and reuse of routing information; therefore, redundant calculations tie up limited resources and slow the network down. Further, according to another centralized route-computing processing model described in the prior art, there is another major problem—in that by making one unit process all of the route-computing process it remains possible to re-route the data in case of a malfunction of some of the units along the data travel path, but disadvantageously when the specific unit that performs route-computing stops functioning, the entire network will fail.

Canadian patents CA 2426769 and CA 2511368, and U.S. Pat. No. 6,553,218 issued to Boesjes disclose a wireless communication network that could be faster than a dial up network, however, disadvantageously, that infrastructure has been developed with little or no attention to security, which is frequently compromised in many different ways.

Among the known prior art is the "mesh" network. Whereas the Internet is mostly a wire-based, co-operative electronic communication infrastructure, mesh is typically a wireless co-operative communication infrastructure between a massive amount of individual wireless transceivers (i.e. a wireless mesh) that have Ethernet type capabilities. This type of infrastructure can be decentralized (with no central server) or centrally managed (with a central server), both are relatively inexpensive, and very reliable and resilient, as each node need only transmit as far as the next node. Nodes act as repeaters to transmit data from nearby nodes to peers that are too far away to reach, resulting in a network that can span large distances, especially over rough or difficult terrain. Mesh networks are also extremely reliable, as each node is connected to several other nodes. If one node drops out of the network, due to hardware failure or any other reason, its neighbours simply find another route. Extra capacity can be installed by simply adding more nodes. Mesh networks may involve either fixed or mobile devices. The principle is similar to the way packets travel around the wired Internet—data will hop from one device to another until it reaches a given destination. Dynamic routing capabilities included in each device allow this to happen. In a typical implementation of mesh each device communicates its routing information to every device it connects with, "almost in real time". Each device then determines what to do with the data it receives—either pass it on to the next device or keep it. The routing algorithm used should attempt to ensure that the data takes the most appropriate (fastest) route to its destination. In a traditional wireless network where laptops connect to a single access point, each laptop typically shares a fixed pool of bandwidth. With mesh technology and adaptive radio, devices in a mesh network connect with other devices that are in a set range. The advantage is that, like a natural load balancing system, the more devices the more bandwidth becomes available, provided that the number of hops in the average communications path is kept low.

Among the prior art discovered is U.S. Pat. No. 5,115,433, filed in 1990, issued in 1992 to Baran et al. who teach a routing method suitable for a legacy network based on the use of absolute geographical coordinates ("AGC") expressly chosen to avoid the use of a routing directory or table that they advise constitutes excess overhead. In the 15 years between the filings in 1990 and 2005, computer processing capacity and memory density have increased while hardware costs have continued to drop, such that the problem they sought to avoid is now less of an issue. In the interim since Baran's solution was invented, node density and reliability have also increased. The inherently planar Cartesian embodiment taught by Baran is disadvantageously suited to a set of nodes situated in relatively low density conditions the location of which is accurately known and relatively static. The Baran design does not contemplate mobile nodes and due to its need for accuracy of node location would not be suitable for dealing with mobile nodes. Although Baran's system allows for growth by adding new nodes overtime, it is a relatively static model that disadvantageously is not suited to random transient conditions arising, such as, for example, when users shut down their wireless devices for varying periods of time. The very characteristic, not relying on a routing directory or table, that Baran cites as an advantage for the solution that it teaches, is in fact a serious disadvantage for operating a wireless network in various different conditions. Below a certain resolution, that depends on the particular hardware (not specified by Baran) used to implement that solution, the use of absolute coordinates fails to distinguish between 2 nodes at substantially the same location, in which conditions the use of a routing table (even a routing table that contains information respecting all of the nodes of a given network) is helpful.

Baran does not define "network director", so it is not clear how this relates to a routing table, however the usage (e.g., the last sentence of the abstract) suggests that a network director is a routing table. As a network grows in device membership, the routing table becomes exponentially larger, which is a big problem for most networks. Baran solved this problem by assigning absolute geographical coordinates to each node and completely eliminating the routing table.

BRIEF SUMMARY

According to one aspect, there is provided a novel system for distributing the data routing path computational work load over many wireless member units ("WMU"), some having multiple processors.

According to another aspect, there is provided a novel method of using wireless member units to share the workload of relaying data packets without needing to calculate and use a single data path for the entire transmission.

By also using identification and computational techniques that reduce the complexity of data path computation and workload caused by the large numbers of units, one of the present embodiments is able to accommodate more wireless units than conventional systems. Therefore, a large-scale wireless network can be deployed over a large area (ultimately, replacing the entire wired Internet) without reducing its data processing capacity. Much like a "bucket brigade" wireless member units cooperate to deliver data packets to their network destinations as soon as possible. The system has the flexibility to account for several criteria that are useful when choosing the "best path" for routing packets through a grid of cells. For example, the number of hops is one measure to determine which of 2 routes to choose, even based on a purely random selection of member units inside the relevant cell there is still a significant advantage in having the "many hands" of member units make the task easier for each participant. It is contemplated that any suitable source of geographical or spatial coordinates, installation addresses, and other information will facilitate identifying the most efficient data path for a given packet being relayed across the network—thereby increasing the effective bandwidth of the network.

As the network grows with increased membership operating on a grid of cells where each WMU is partly identified by the cell in which it is located, proximal or otherwise frequently used unit IDs may be kept available for re-use in a table stored on at least some of the WMUs located in adjacent cells. Each time a new "member" (whether fixed, portable, or mobile) enters a cell and is initialized, this change creates an opportunity for all WMUs within its range to update their records respecting choices open to them in relation to relaying data packets in the future.

According to one aspect, there is provided a wireless system for transferring data packets efficiently over large network coverage areas, the system comprising: a plurality of portable link units ("PLU"), for receiving and sending data between member devices; at least one gateway unit ("GWU"), for exchanging data with external networks; a database unit ("DBU"), for managing the network, including tracking services delivered to member devices connected to said PLUs; and programming means for distributing the routing computational work load between said PLUs According to another aspect, there is provided a method of minimizing the re-computation of data travel paths by individual wireless member units by distributing routing computations between the wireless member units of a large-scale wireless communication network, serving a network coverage area defined as cells of a grid, the method comprising: determine the desired grid direction for transmission from a current source unit to a destination unit; query available wireless member units within direct signal transmission range of said source unit, through which to relay data packets along said grid direction, and store resulting network topology information onboard the current source unit, for the purpose of reusing and sharing said information; compare and rank said available wireless member units, based on performance criteria, and compute only that part of the total data path route that falls within the direct signal transmission range of said source unit; select a suitable wireless member unit for the next hop of data relay; transmit a data packet from the current source unit to said select wireless member unit associated with said next hop; and repeat the above steps using said select wireless member unit associated with said next hop as the then current source unit.

According to a further aspect, there is provided a method of enabling the operation of a large-scale wireless communication network serving a network coverage area, for permitting the exchange of data packets between member devices, comprising: define a grid of cells in relation to said network coverage area; position a plurality of PLUs within said grid, each PLU being operably connected to a member device located within a cell and the signal transmission range of at least one other PLU; locate at least one GWU within said grid, for enabling access to external sources of data; assign identification to each PLU and GWU; and initiate communication between said PLUs and GWU to create a table of information respecting active links available to each member unit, for determining the possible paths over which to route data packets.

According to a further aspect, there is provided a method of securely transmitting data across the wireless system, the method comprising: receive data from a computing device connected to a network member unit; check for legitimacy of the data and delete data if data is not legitimate; encrypt legitimate data; add a relay layer, including the source and destination ID and grid cell number, to said encrypted data; transmit packet comprising said encrypted data and relay layer to its destination; receive packet and remove relay layer; and decrypt and extract data.

Advantageously, the use of the system of one embodiment with a sectored antenna improves system efficiency by increasing the packet transfer capacity (not the same as reliability) of the cell in which the sectors are located. As number of WMUs in the network increases, chance of radio signal interference increase. One embodiment incorporates different techniques to maximize the capacity of sending data packet at any given time. WMUs may have a set of sectored antenna to reduce the chance of radio signal interference. Unlike omni-directional antenna, sectored antenna covers limited angle of area. Even so, by pointing each sectored antenna to proper direction, a set of sectored antenna can cover all directions. As an example, properly pointed 3 sectored antennas each of them covers 120 degrees will cover 360 degree (often seen at cellular phone tower), so that a WMU can communicate other WMUs in any directions. WMUs in signal coverage area of different sectored antenna can communicate other WMUs with the same channel of radio frequency. Even though, the number of available channel remains the same, more WMUs can communicate at the same time. As the result, capacity of the network increases. Moreover, because radio signals spread in all directions covered by the antenna, all wireless nodes within a signal range receive a packet, even though the packet isn't directed to a particular wireless node. In conventional wireless node, those received packet that sent to another node will automatically be deleted; therefore, wireless nodes need to send separate signal to be discovered by neighboring nodes. This process creates extra radio signal traffic. Instead of deleting received packet that is for other node, by reading the packet header, WMUs can identify sending WMU. This eliminates the need of sending separate discovery packet. Furthermore, WMUs can send a packet to another WMU that is not the best node based on path selection criteria to see if that WMU is still on line. Conventional routing protocol tends to be very strict and always chooses the best possible node. Giving little slack to path selection process eliminates the need of "house-keeping packet" and creates more capacity for payload traffic.

According to one embodiment, a method of securely transmitting data across a wireless system comprises: receiving data from a computing device coupled to a network member unit; checking said data for legitimacy and deleting that data if not legitimate; encrypting legitimate data; adding a relay layer, including a source and destination ID and grid cell number, to said encrypted data; transmitting packet having said encrypted data and relay layer to its destination; receiving said packet and removing said relay layer; and decrypting and extracting said data.

According to one embodiment, a system for terminating a denial-of-service (DoS) attack comprises: a filter to reroute all packets, destined for a server under attack, to at least one verifier; said at least one verifier, to reply to all SYN packets by sending back ACK/SYN packet to an address provided and accepting all ACK packets returned then redirecting all packets to at least one bypasser; and said at least one bypasser to open a connection to permit unfiltered communication with said attacked server.

According to one embodiment, a method for terminating a denial of service (DoS) attack comprises: detecting an attack in progress; activating a filter to re-route all packets, destined for a server under attack, to a verifier; commanding said verifier to reply to all SYN packets by sending back ACK/SYN packet to the address provided, including to all forged addresses; commanding said verifier to accept all ACK packets returned and redirect all packets to a bypasser; and commanding said bypasser to open a connection permitting unfiltered communication with the server under attack.

According to one embodiment, a method for using a relay table to permit non-mobile wireless member units (WMUs) to send data packets to a mobile WMU in motion, comprises: sending a data packet destined for a mobile WMU to a non-mobile WMU that last had communication with said mobile WMU; checking a relay table of said last communicating non-mobile WMU for a location-update data packet including the unit ID of a selected non-mobile WMU; if the relay table contains update, then relaying a packet to selected non-mobile WMU until no update is found; and delivering the data packet to the mobile WMU.

According to one embodiment, a method, for sorting a local or cell level routing table without computation, comprises: updating a status of inactive wireless member units (WMUs) by deleting their entry from said table; and updating a status of newly active WMUs by adding their entry to a bottom of said table.

A detailed description of one or more embodiments is provided below. It is to be understood, however, that the embodiments are not to be constructed as limited to this description. The accompanying drawings, which are incorporated in and constitute a part of this specification, illustrate preferred embodiments of the method, system, and apparatus and, together with the description, serve to explain the principles thereof.

BRIEF DESCRIPTION OF THE SEVERAL VIEWS OF THE DRAWINGS

One or more embodiments will now be described, by way of example only, with reference to the accompanying drawings, in which.

DETAILED DESCRIPTION

Figure 1:
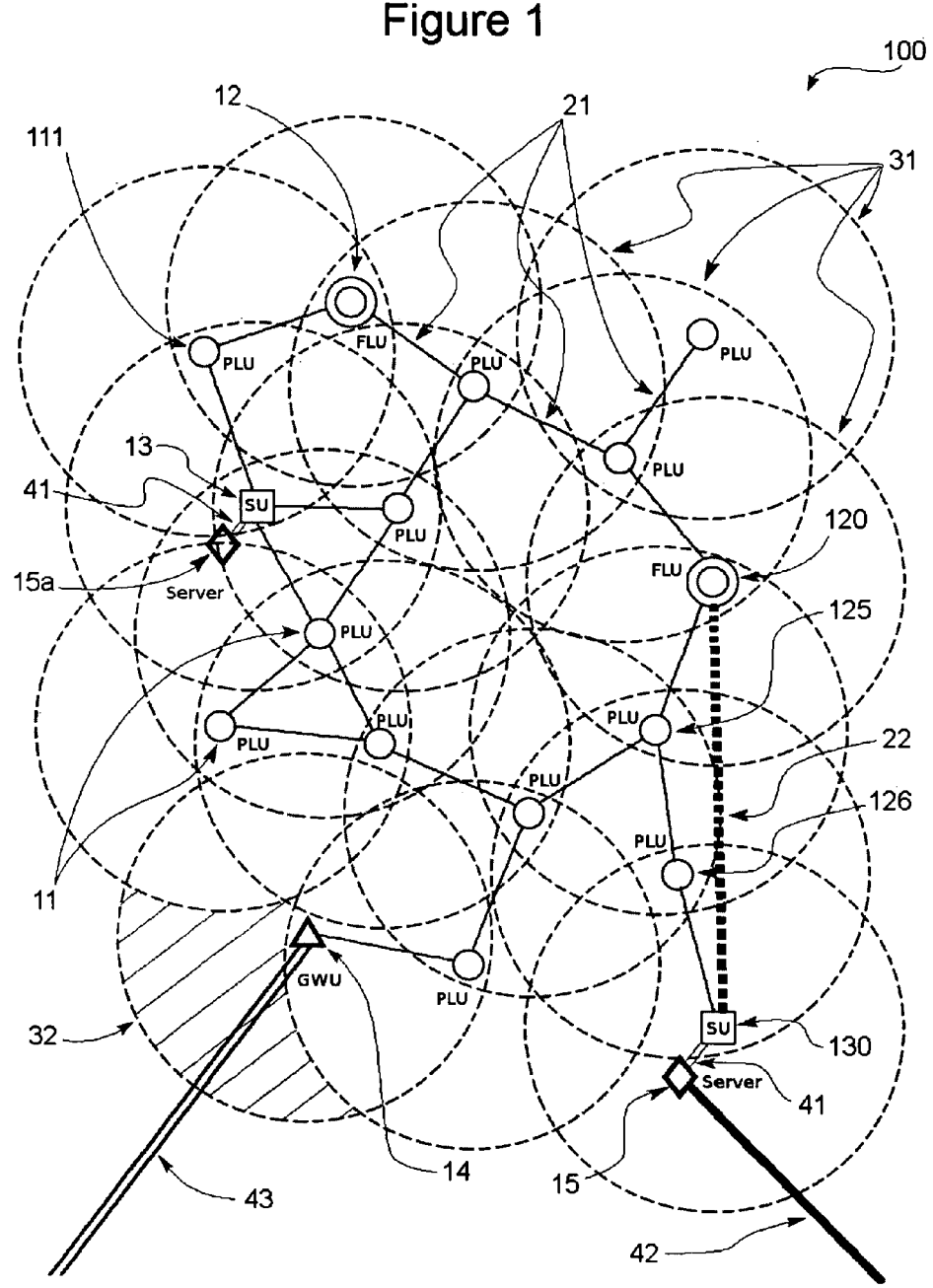
FIG. 1 is a schematic diagram of the system of one embodiment.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

One embodiment solves the same problem of Baran in a very different manner by creating a grid of cells and limiting the size of the routing table that only monitors devices local to the cell. By using a local or cell level routing table—that maintains information respecting only those devices located within a given cell or a limited number of cells proximal to one another—there is no need for high precision respecting either the coordinate values used to define location or the physical location of deployment.

The system of one embodiment is very user friendly and has been designed for deployment by non-technical end users who simply plug-in their wireless member units (WMUs) that self-identify the cell into which they have been placed—or are later moved. The dynamically updated local or cell level routing tables used in each cell of the grid are much smaller than the conventional network routing tables contemplated by U.S. Pat. No. 7,327,683 filed in 2002, issued Feb. 5, 2008 to Ogier, which invention is a fundamentally different solution to a different series of problems. Ogier's design shares only changes to the network—whereas one of the present embodiments shares the entire local or cell level routing table with other WMUs in that cell. Similarly, the system of one embodiment computes various possible partial paths and ranks those "paths" according to various criteria, then selects a suitable path and sends the packet to a WMU at the beginning of the chosen path. Instead, Ogier ranks the link between neighbouring "nodes." The system of one embodiment creates only "part" of each of the possible paths to the destination, while Ogier's system creates the entire path based on one shortest-hop path for each node. Disadvantageously, when one node dies in Ogier's network, no packet can reach the destination unit until the network routing table is updated. Advantageously, in the network of the present embodiments—if a given (downstream) node is no longer available, then the currently sending node simply selects another path so the packet can reach its destination.

The AGC-based design can work well for applications such as cellular phone towers (e.g., the location of each node is completely controlled and nodes are separated by relatively large distances) that are deployed and maintained by skilled technicians. However the system of one of the present embodiments can be deployed by its end users—ordinary people who take WMUs home and plug them into a residential power receptacle.

And, when tight deployment is involved, disadvantageously the use of AGCs as part of the identifier demands very high precision of positioning in order to distinguish tightly or closely deployed nodes, due to limits on system resolution. For example, if nodes were placed in each room of an apartment building, a pair of nodes might be placed on opposite sides of a common wall (e.g., less than 1 m apart) but even global positioning system devices tend to have an accuracy of +/−15 m, such that in a user deployable network, it would be difficult to reliably assign AGCs to such closely located nodes. In order to satisfy the need for higher precision, the number of bits required to express each AGC increases causing all packets to be transmitted with a larger header thereby consuming some of the data payload space or diluting the payload to packet ratio of each transmission and offsetting the advantage that such systems hope to achieve by eliminating the routing table.

Advantageously, the definition of a grid of cells (rather than absolute geographical coordinates or "AGC") in combination with a local (e.g., cell level) routing table permits the cells to be used for directing packets, which is a completely different concept than using cells for controlling the area over which a transmission is broadcast. According to one embodiment, it is not necessary to broadcast or send the same packet to every WMU inside a cell because (upon reaching a destination cell) the local or cell level routing table may be accessed to direct data packets to a series of active WMUs that channel the transmission to its "end user" device. Further, by using a sectored antenna in congested cells on the particular grid, it is possible to restrict the transmission to particular sectors within a cell, thereby advantageously reducing the number of packet collisions and network interference. Whereas the assignment of ID numbers (e.g., IP and MAC addresses) is known, the use of cell numbers from a grid is novel. The ability to cross-reference (the locational scheme of one embodiment) grid cell numbers to a conventional latitude and longitude based reference scheme using absolute geographical coordinates to define node location—does not make these schemes the same. The grid of cells could be laid out with the grid to be consistent with or even to overlap and be coterminous with an existing body of information respecting range roads and meridians—however the grid layout may instead be defined in any proprietary manner that permits the cell ID to be used by a WMU to define its current location. When selecting a "best choice" partial path over which to relay data packets, the system of one embodiment directs transmission along a grid of cells, since inside each cell all WMUs define themselves in part by that same cell number or ID. For example, while they are inside cell number 150 devices A and AA both identify themselves by and respond to (received) transmissions directed to cell 150. However, internally devices A and AA are distinguishable based on their unique identifiers according to a scheme the particulars of which are maintained in the local or cell level routing table. Advantageously, one embodiment of the method, unlike the teachings of Ogier in U.S. Patent Application Publication No. 2003/0179742 according to which a separate signal is transmitted to discover available WMUs (that could act as node to relay data along a selected path), the system of one of the present embodiments uses packet miss-reception to discover available units—rather than simply deleting such packets as is conventionally done. For example, the device AA would check a packet header and discover that it was for device A and sent by device X (in adjacent cell 149) based on which device AA may update its local or cell level routing table respecting device X as being (currently) available upstream. Similarly, if device A then miss-transmits ACK to confirm to device X the packet was received, then AA may update its local or cell level routing table respecting the availability of device A downstream.

In a parallel manner, the system of one embodiment periodically sends payload data to a node at the beginning of an alternate path—in order to verify that such nodes remain online and available for relaying—rather than sending a separate test signal to discover available units.

Referring now to the accompanying drawings, FIG. 1 shows a schematic diagram of the system, denoted generally as 100, of one embodiment. Each dashed circle 31 represents the maximum signal transmission range of a given wireless member unit ("WMU"). Each WMU 111 is shown at the center of its own circle 31. The system of one embodiment comprises various types of wireless member units, including:
  database unit ("DBU");
  gateway unit ("GWU");
  server units ("SU");
  fixed link units ("FLU");
  a plurality of portable link units ("PLU");
  peripheral peer units ("PPU"); and
  stand-alone peer units ("SPU"),
  (generically referred to as WMU) wherein:
Portable Link Unit (PLU)

Each PLU comprises: one or more wireless communication modules; one or more processing modules; one or more memory modules; and one or more interfaces for connecting to other devices such as but not limited to personal computers, routers, hubs, and switches. A PLU, could, for example, be a reprogrammed Linksys® Broadband router WRT54GS (typically programmed not to communicate or interfere with other broadband routers) that has been programmed to communicate (e.g., relay data to and from) with other PLUs. Also, the WRT54GS has a receptacle (typically for connecting a broadband modem) into which at least one wireless transceiver is connected to allow the PLU to communicate via radio signal. According to another embodiment, PLUs may each have multiple processors (e.g. separate for relaying and other tasks such as route computing) and multiple wireless transceivers (one for communicating only with other PLUs, and one for communicating with PPUs and PSUs). According to an embodiment of the system, PLUs use a proprietary routing protocol, permitting them to operate more securely using authentication and legitimacy checks.

Fixed Link Unit (FLU)

The FLU is basically a high capacity PLU that is placed at high traffic locations, such as large apartment buildings, shopping malls, and office buildings. Some FLUs are equipped with a directional antenna and/or high power transmitter to provide the functionality of wireless connection 22 on FIG. 1.

Server Unit (SU)

Similarly, each SU comprises: a PLU; and one or more interfaces together with many ports for connecting to servers on the Internet. A SU is somewhat like a powerful PLU, and could, for example, be based on a reprogrammed Cisco® 7613 Router that is connected to the Internet via a hard-wired connection. However, the SU connects to the system of one embodiment via wireless transceivers.

Database Unit (DBU)

The DBU stores information to manage the network. Other types of units can store a copy of information, but DBU stores the original. The DBU is in a sense a high-powered version of the PLU having additional software, such as a DMS (database management system). Each DBU uses its wireless communication modules for receiving, transmitting, and relaying data between itself and other DBUs, GWUs, SUs, FLUs, PLUs, PPUs and SPUs. According to one embodiment of the system, the DBU responds only to proprietary commands used within a particular operator's network, which advantageously reduces the risk of manipulating information stored on it. As the network's database grows, an external database management computer, such as a MYSQL™ (a registered trade mark of MySQL AB®) Server, may be connected to DBU. For example, to manage a Hotmail™ implementation the MySQL™ Server may be connected to a Hotmail™ server. Many users' e-mail and personal setting are stored on a MySQL™ Server. Hotmail™ server receives requests from users, then retrieves appropriate information from the MySQL™ Server.

Gateway Unit (GWU)

Each GWU is basically a "protocol converter" that comprises of a PLU; and one or more interfaces for connecting to external networks, such as but not limited to: the Internet, the local wire based telephone network, and wireless phone systems. The protocol used with a given embodiment of the system is related to the grid system selected. When a proprietary grid is implemented, the proprietary protocol associated with it has to be converted to/from a standard protocol in order to communicate with existing Internet, or another proprietary protocol used on a private external network.

Peripheral Peer Unit (PPU)

Each PPU comprises: one or more wireless communication modules; one or more processing modules; one or more memory modules; and one or more interfaces for connecting to personal computers and other human interface devices such as but not limited to cellular phones. The PPU could, for example, be based on a reprogrammed Linksys® wireless-G Notebook Adapter WPC54G, or a wireless-G PCI Adapter WMP54G. Whereas the example devices typically use IEEE standards, according to an embodiment of the system, the PPU uses a proprietary signaling means. Further more (unlike conventional devices that cannot change the router which they are communicating), PPUs can at any time during operation switch the specific PLU with which they are communicating, while they are transmitting data and without losing any data packets. According to an embodiment of the system, PPUs use a proprietary routing protocol, run authentication and legitimacy checks, and can relay data from/to any other unit.

Stand-alone Peer Unit (SPU)

Each SPU comprises: one or more wireless communication modules; one or more processing modules; one or more memory modules; one or more interfaces for connection to other devices such as but not limited to an external antenna; and one or more human interface devices such as but not limited to speaker phones, micro phones, camera, and displays. The SPU could, for example, be based on a RIM BlackBerry™ 8700r. Whereas the BlackBerry™ uses a radio signal compatible with RIM's network. SPUs would use any suitable radio signal compatible to the network they are part of. According to an embodiment of the system, SPUs use a proprietary routing protocol, run authentication and legitimacy checks, can relay data from/to any other unit, and can at any time during operation switch the specific PLU with which they are communicating.

According to one embodiment of the system, for billing and security reasons, some PPUs and SPUs can be programmed not to relay data. For example, those non-relaying PPUs or SPUs may be used to create a private LAN communicating with the main system. Mobile relay units are select PPU and SPU that are enabled for relaying data within the present system. As these mobile relay units move within the grid of the network, they can dynamically reassign themselves transient location components for their unit ID by copying the grid cell number from any suitable (e.g., that proximal PLU having the strongest signal) nearby stationary WMU (e.g., any or all of the DBUs, GWUs, SUs, and FLUs), or they can use a stationary unit or a PLU with a strongest signal as a reference point, but not necessarily assume any grid cell number for a period of time during which having a precise unit ID is not necessary and continual updating would consume processing power.

To form a large-scale network of wireless units, distributed PLUs may be placed in a variety of geographical locations, and each PLU is located within the transmission range of at least one other PLU. The PLUs are each capable of relaying data and the signal transmitted by one PLU can be relayed by any of the other PLUs within its range, such that its signal can travel beyond its own maximum transmission range to reach distant wireless units. Each of the DBUs, GWUs, SUs, and FLUs may also have the capacity to relay that signal. These wireless units form and extend the signal coverage of the large-scale wireless network. PPUs and SPUs may also exchange data with any of the: PLUs, DBUs, GWUs, SUs, and FLUs, such that any of the PPUs or SPUs can wirelessly send or receive data anywhere in the coverage area of the large-scale wireless network that they make up.

When a subscriber acquires a PLU from the network operator, a grid cell number will be assigned based on the new user's location (e.g., geographical or regional address) within the locally implemented scheme for identification. If in the future the subscriber moves to a different location within the network of one embodiment, when that same PLU is first powered on at its new home, the PLU checks the grid cell number of each other WMU near it and dynamically assumes the most common grid cell number for itself. For example, if the PLU finds 5 other WMUs within its direct signal range and 3 of the 5 have a grid cell number 0505, while only 2 of 5 have a grid cell number 0405, then, the newly relocated PLU will assume the grid cell number 0505 as part of its unit ID. Such re-assignment may happen each time a PLU is moved from its previous location.

As the number of wireless units forming the above large-scale wireless network increases, conventional computation of each data routing path (a sequential trace of wireless member units that data is expected to be relayed through) becomes more onerous, because the size of its routing table grows with network size. Once a large number of wireless member units are operating, the route-computing step of the transfer process represents a substantial workload that could quickly become too much for a single WMU to handle. The route-computing sequence involves both collecting the required information and then computing at least one entire data path between the originating unit and the destination unit. Inadequate processing power in the specific unit assigned the route-computing step would degrade the network's data transferring capacity and operational speed. In order to eliminate this problem, according to the method of one embodiment, advantageously each wireless member unit is assigned a grid cell number (or other suitable location based identification) based on where (e.g., in which cell of the grid) those units are located at the relevant times. Mobile and portable units can re-assign grid cell numbers to themselves dynamically based on the grid cell numbers assigned to those operational wireless member units that surround their then location. By comparing its own grid cell number to that of the destination grid cell as set out below, each data sending or relaying wireless member unit determines which neighboring grid cell number is substantially en-route to the destination grid cell number, thereby calculating the first cell-to-cell (or inter-cell) transmission on the currently selected data path. This process is repeated in each cell of the grid into which the data moves as it passes along its then selected path.

Once the data reaches its destination grid cell number or cell, operational wireless member units within that cell can efficiently route the data to the destination unit using any suitable scheme. Within a given cell all then operational wireless member units will have the same grid cell number but they will each have a unique identifier, such that, for example, wireless member units could use a signal strength or quality comparison combined with availability to assess which sub-path to send data over.

Advantageously, by example of how the system of one embodiment evolves in use, according to one embodiment of the method, network processing capacity increases by simply deleting from the routing table those WMUs that are offline or for any reason no longer available in the grid. Similarly newly discovered WMUs that are coming online as the network grows are automatically appended to the local or cell level routing table that it is no longer necessary to sort during normal operation. Consequently, as each refreshing of the routing table takes place the quality of the WMU's selected to relay data improves without the need of any calculation such that no processing cycles are wasted.

Figure 2:
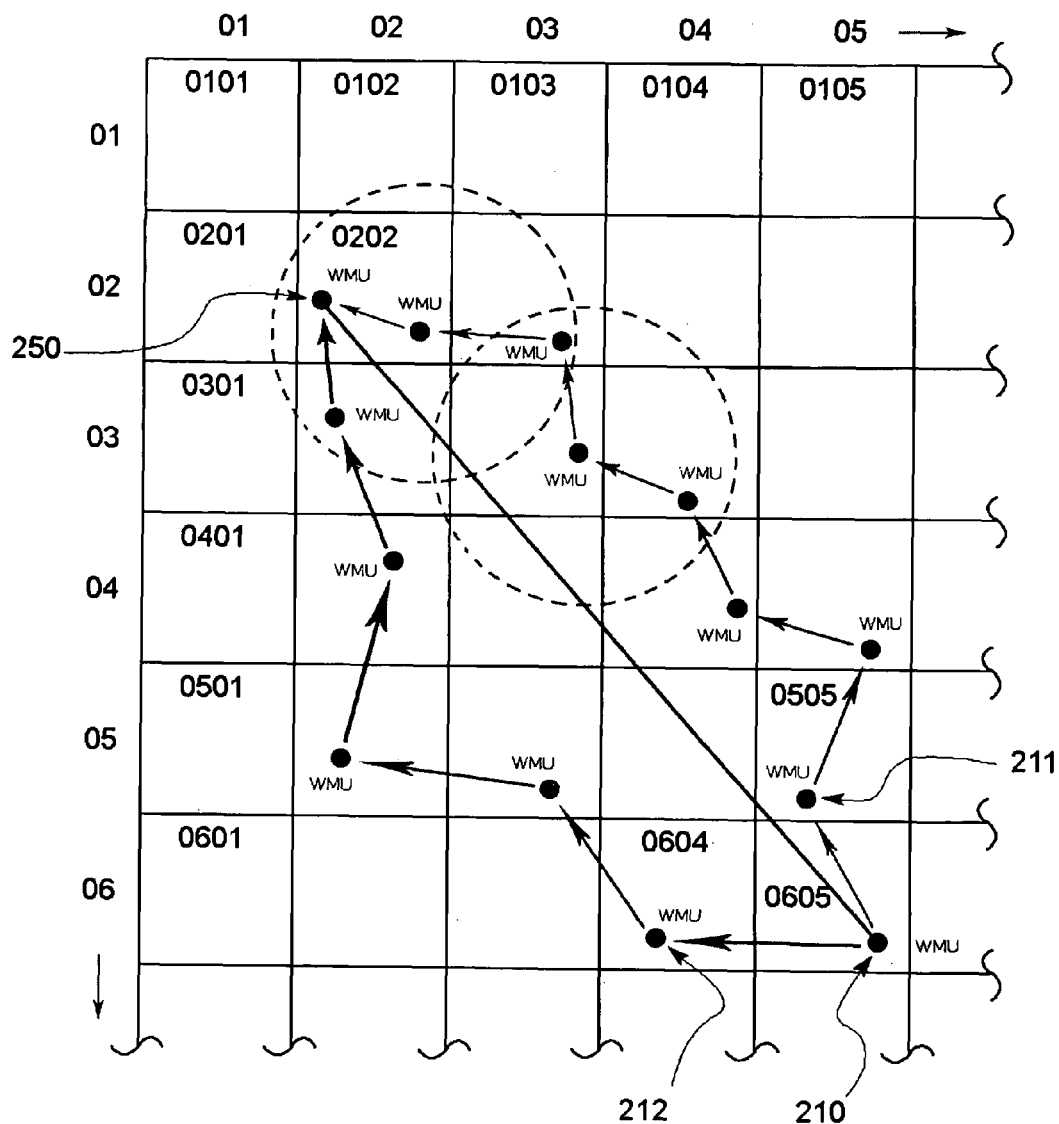
FIG. 2 is a schematic diagram to show how a "grid" may be used to permit the system to route its data, in which 2 alternate data paths are illustrated, according to one embodiment.
Figure 3:
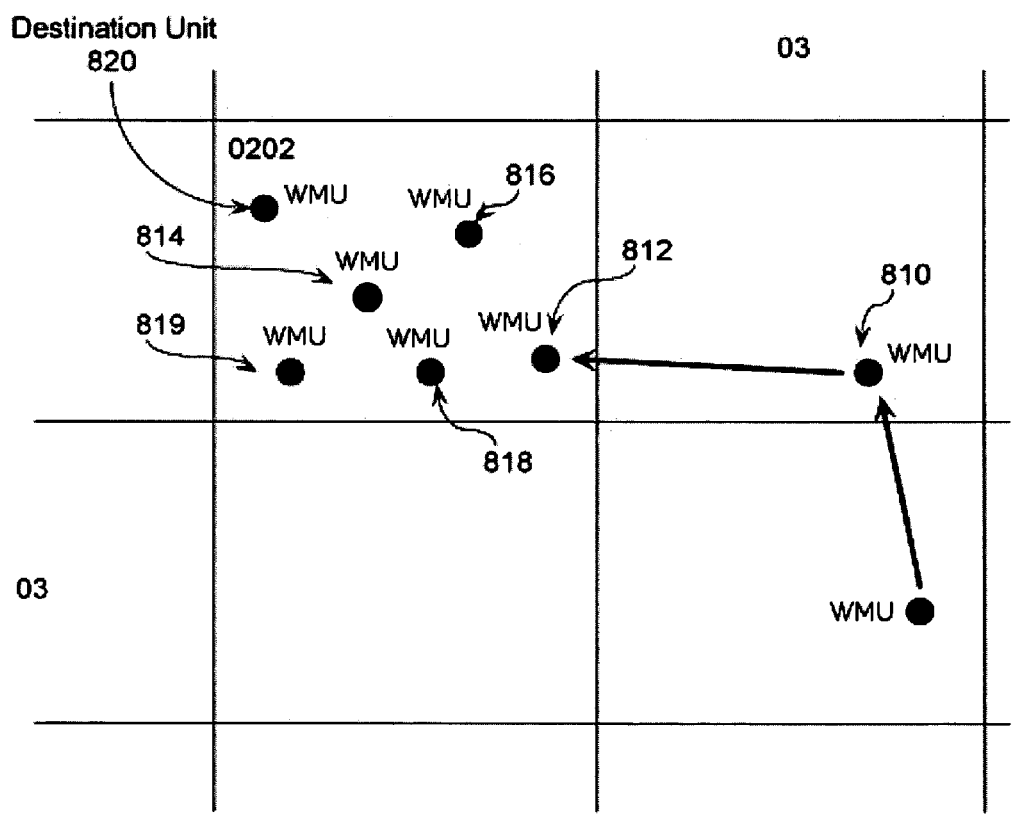
FIG. 3 illustrates a view of a sub-region of the grid of FIG. 2, in which sub-region multiple wireless member units are located inside a single cell, according to one embodiment.
Figure 11:
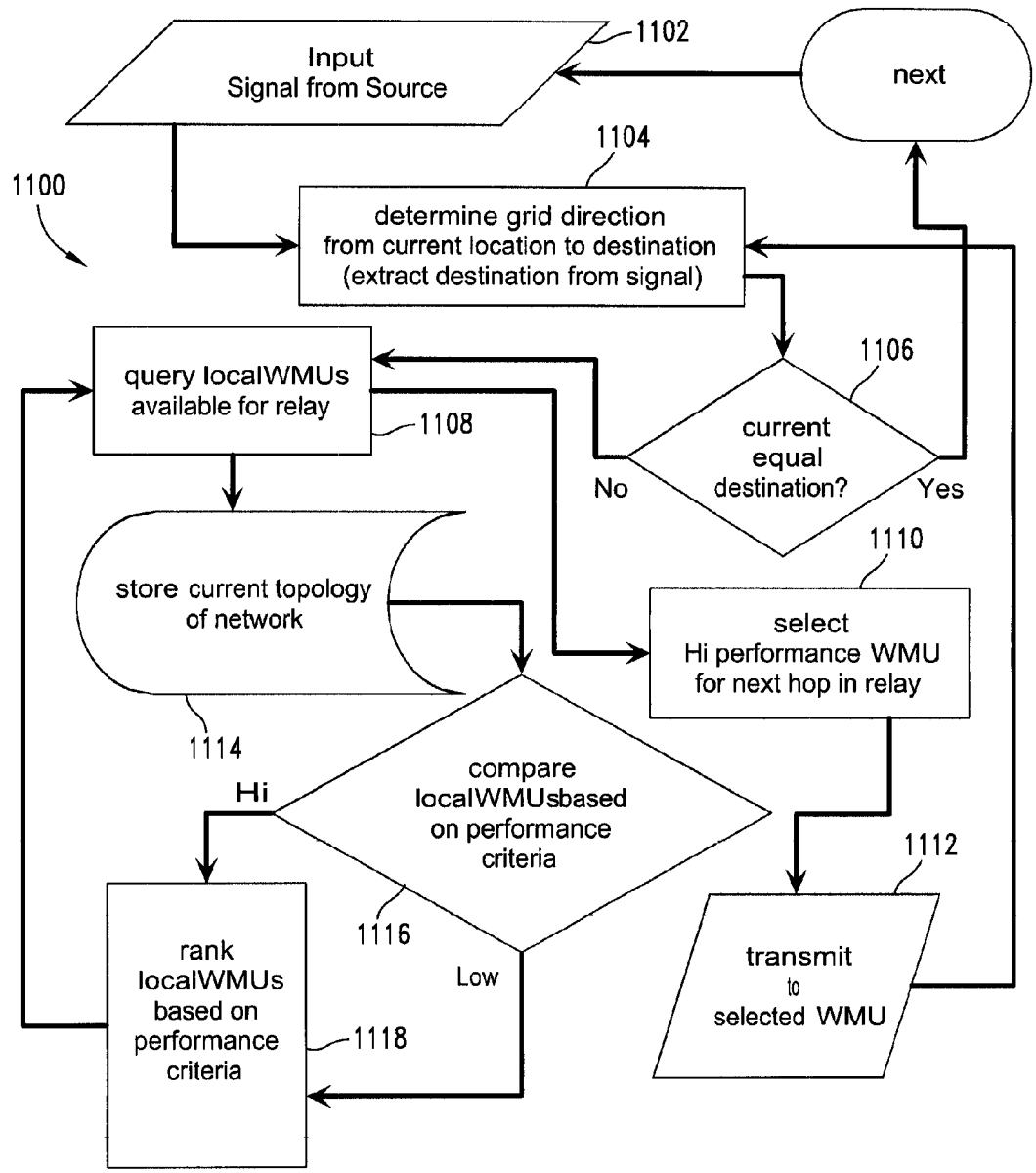
FIG. 11 is a flowchart of one embodiment of the method.

As shown in FIG. 2 (and considering the accompanying information of the embodiment of a method 1100 in FIG. 11), an originating unit 210 in grid cell number 0605 selects a path (enroute to a destination unit 250 in grid cell number 0202) over which to send data that involves a first hop (a direct node-to-node transmission, since if there is more than one PLU on a cell-to-cell transmission path, it is referred to as an inter-cell transmission) into grid cell number 0505 and eventually into grid cell numbers 0303 then 0203 where it relays data through WMU 810 as shown in FIG. 3. A WMU in cell 0605 compares destination grid cell number 0202 with originating grid cell number 0605 in order to determine an initial path and direction in which to deliver data on its first hop (1102-1104 in FIG. 11). However, upon arrival at grid cell number 0203, WMU 810 need only compare destination grid cell number 0202 and its own grid cell number 0203 (e.g., not originating grid cell number 0605) such that the remaining route is less complex.

In this example, from intermediate grid cell number 0203, WMU 810 transmits data into the destination grid cell number 0202 through WMU 812 where a cell level sub-path (e.g., the path regarding which information is stored in the local or cell level routing table) needs to be determined by any suitable means. As shown in FIG. 3 the most direct (e.g., shortest length of path, since the spatial separation between the locations of 812 and 820 remains the same regardless of the path chosen, but the length of the path changes, e.g., the path 812-814-820 is shorter than the path 812-818-819-820.) route would be through WMU 814, but if that preferred unit is not operational for any reason at the relevant time, then WMU 812 (if out of direct range of destination WMU 820) has the option of either or both of WMU 816 direct thereafter to WMU 820, or WMUs 818 and 819 in sequence and thereafter to WMU 820. All other factors being equal WMU 816 would seem the best choice, however if WMU 816 is suffering relatively heavy traffic or if WMU 818 and 819 have a combined higher reliability, capacity, speed, security, and/or other relevant characteristics then intra-cell relaying through WMU 818 and 819 may in various circumstances be preferred and superior to either paths through WMU 814 or 816. Advantageously, each wireless unit participating in the data relay only needs to compute that part of the total route within its own region of the grid wherein there are a limited number of wireless units from which to choose, so that the route-computing computational step is simplified.

Unlike the WMUs of one of the present embodiments, disadvantageously, conventional routing devices have no inherent ability to compare routes based on geographical separation, and both paths 812-814-820 and 812-816-820 have 2 hops. According to an embodiment of the system, the implemented grid numbering and WMU identification program will include a means to take length of path into account. However, as the network grows and each of the WMU's learns about other WMU's within its range the quality of selection will increase. To compare alternate paths each having the same number of hops, the sending unit can always compare other factors such as signal strength, since a stronger signal implies a shorter distance (not always the case), which tends to improve performance. Any suitable means for comparing paths combined with historical information about performance may be applied to enhance system efficiency and reliability. Querying WMUs for information (such as path length, signal strength, capacity, speed, security, etc.), selecting the hi-performance WMU for the next hop, and transmitting to the selected WMU are shown at 1106-1112 in FIG. 11.

According to one embodiment of the system, wireless units store data travel path information (e.g., in tables) in their onboard memory modules (which information is typically overwritten as the network's topology changes) and share that information with other wireless units within their range, so that the system's work load in re-computing the data travel paths is minimized. The stored information can be used to compare WMUs with each other based on performance criteria, and to rank based on the performance criteria. The storing, comparing, and ranking are shown in 1114-1118 in FIG. 11.

Advantageously, each WMU being capable of and sharing in the work load that is route-computation, means that the failure of any individual WMU will not cause the entire system to fail. Any WMU can store information used for the route-computing process, and that information may be updated and shared with other WMUs and compared periodically for consistency. According to one of its embodiments, the system includes mobile peripheral peer units and stand-alone peer units, which can exchange data in transit during periods when such mobile WMUs are within a signal coverage area for their network. Each WMU can compute a route and reroute the travel path for individual packets sending them via different paths in an effort to optimize the transmission of messages.

Still referring to FIG. 1, each WMU (e.g., each PLU 11) within the transmission range 31 of another WMU can link to it wirelessly, which links 21 are here denoted as light solid lines for ease of identification. Similarly FLU 12 (shown as double solid circle), SU 13 (shown as a square), each GWU 14 (shown as a triangle), and servers 15 (shown as a diamond), within any part of the network coverage area may be connected through inter-stationary-unit links 22 (shown as a heavy dotted line), links 41 (shown as a light double solid lines), conventional links 42 (shown as a heavy solid line) and/or link 43 for connection to external network such as Internet, or phone network (shown as heavy double solid lines).

Thereby a substantial collection of WMUs (most of them being PLU 11) form the basis of a large-scale wireless network. For ease of reference and understanding, FIG. 1 illustrates only a small number of WMUs as a sample of the system of one embodiment, which may be connected to external networks such as Internet, or the telephone network through a GWU 14 over link 43. Each SU 13 may be connected to any server 15, which may be but is not limited to web servers, mail servers, or name servers, over a link 41. Each server 15 may alternately be connected to the Internet or other external network over a conventional link 42, or they may operate without being connected to the Internet for the purpose of preventing denial of service ("DoS") attacks from disabling the network or its members, or for dealing with operations that are too far from an Internet back bone element. Servers having no conventional connection to the Internet (e.g., server 15*a*) may still function since they are able to exchange data with the Internet through other portions of system 100.

When conditions such as heavy traffic load, in the line of sight of other stationary WMUs, or an owner of a building installs an antenna on his building, are met, stationary units may be directly linked to each other using any suitable transceivers or wires. For example, in FIG. 1 a FLU 12 (identified as WMU 120) and a SU 13 (shown as WMU 130) are illustrated linked over an inter-stationary-unit link 22. Data may travel over link 22 instead of going through any PLU 11 (here shown as WMU 125 and 126). Consequently, those inter-stationary-unit links 22 have the effect of enhancing the bandwidth of the network. Further, inter-stationary-unit links 22 can be used to transfer member data through an area not covered by the installed system, thereby connecting isolated networks. It is understood that a link 22 in FIG. 1 can enhance bandwidth, but inter-stationary-unit links over non-covered area can connect 2 or more regions of a network. For example, if City 1 and City 2 are each separately served, to connect those 2 network areas, an operator can install "line of sight" antennas in each of City 1 and City 2 rather than installing many non-subcribing PLU between City 1 and City 2. It is also to be understood that other WMUs, such as a DBU (not shown in the diagram), FLU 12, SU 13, or GWU 14, may also extend the coverage of this network. For example, as illustrated in FIG. 1, a GWU 14 extends network coverage through area 32, but without GWU 14 the shaded area 32 would not be covered. By installing GWU 14, shaded area 32 falls within the network coverage area because GWU 14 can also relay data packets.

The large-scale wireless network of one embodiment can identify more than one data travel path from a given WMU to another particular WMU. In FIG. 1 there is more than one path to reach any PLU from a server 15. Data can travel through any available path, and in the case of an unavailable WMU along the selected data travel path, the system of one embodiment reroutes the data using the then available WMUs. It is to be understood that by comparing destination grid cell number and originating grid cell number. En-route, the sending grid is in effect the interim originating grid, such that it only compares where it is, not where the data once was.

Advantageously, the method of one embodiment is fault tolerant since it is implicit that by routing in this manner, even though some of the WMUs will periodically be offline or for any reason not available to relay within the system grid, the load sharing between WMUs permits the network to continue to function.

FIG. 2 illustrates how a "grid" may be used to permit the system to route its data. A grid is specified over the coverage area or sub-region of the installed system. In FIG. 2, the shape of the selected grid is a simple square, such that the individual cells formed by intersection in the grid are also square, but it is to be understood that any shape may be used. In the example shown in FIG. 2, rows and columns of grids are designated (here numbered) sequentially, and each grid is assigned a grid cell number corresponding to the row and column of the grid. Here, 2 digit numbers have been used to number rows and columns. However, any set of sequential numbers, alphabet, or bits may be used to designate cells and capture relative location and direction between the cells of the grid. Similarly, different algorithms may use the grid designators. And, those algorithms may be changed periodically to enhance the security of a given system implementation.

According to FIG. 2, a given WMU 210 is sending data to another WMU 250 at a destination cell designated by grid cell number 0202. As described in detail elsewhere herein, by comparing two grid designators (e.g., cell numbers), one for the grid 0605 and one for the grid 0202, the data sending WMU 210 may determine which of grids 0505 and 0604 is "better" (e.g., closer) for the purpose of relaying to grid 0202, and sends data to an operational WMU in the selected grid. In FIG. 2, WMU chooses between WMU 211 in grid 0505 or WMU 212 in grid 0604 assuming that they are both operational and available at the relevant moment in time. All other factors being equal, if proximity is the governing criteria, then, as shown in FIG. 2, WMU 210 will send its data to WMU 211 to continue the relay to WMU 250 as the destination unit. Advantageously, once WMU 211 receives the data packet in issue, WMU 211 now takes control of the relay process with the data residing 1 hop closer to its destination. WMU 211 becomes the controlling unit and makes a similar but simpler determination of where to send the packet on its next hop. Since in a mature functional network each cell in the grid will be occupied by more than one WMU, the WMU 211 will have alternatives to which to send its data packet even after determining the "best" grid cell number to which to relay the subject data packet. However, typically each cell of a grid will be occupied by a relatively small numbers of WMUs making for a simple route-computation process. Furthermore, those reliable established inter-grid data travel paths for a given region of the grid may be stored (e.g., in tables of historical information kept) on board each WMU, for reuse during the next inter-grid transmission, such as shown in 1114-1118 in FIG. 11.

It is to be understood that as WMU capacity and intelligence increases, the amount and quality of information available to a given WMU will increase such that sharing of route information can continually increase the network's effective bandwidth.

Since PPU and SPU member units are portable and some are actually in motion, some of those units may be assigned the same grid cell number as a local WMU, which verifies the temporary location of the PPU or SPU involved in the data reception, transmission, or relay. The grid cell numbers assigned to moving PPU and SPU can be updated as those units change their location within the coverage area of the system of one embodiment.

Figure 4:
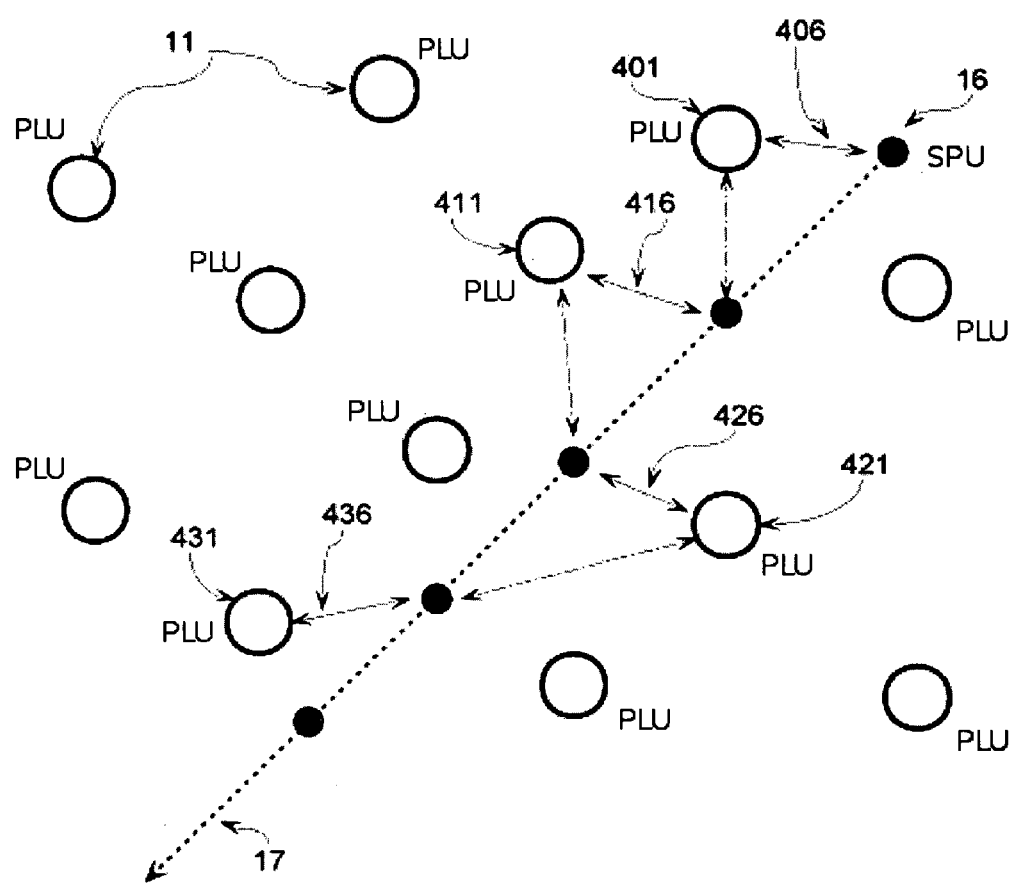
FIG. 4 illustrates the extension of the data path to a moving stand-alone peer unit, according to one embodiment.

FIG. 4 illustrates how one embodiment extends its data travel paths to include a moving PPU or SPU wireless member unit. SPU 16 is shown moving in the direction of path 17 through a portion of a geographical area having coverage from a system 100 in which there are a plurality of PLU 11 installed and operational. By way of example and not in limitation, as SPU 16 moves along its roadway or other physical path 17: a wireless link (illustrated as signal 21 in FIG. 1) shown as bi-directional arrow 406 forms between SPU 16 and PLU 401, then later breaks off to be replaced by signal 416 between SPU 16 and PLU 411. Any suitable roaming technology may be used to form and replace bi-directional arrow 406 with signal 416, which is replaced by signal 426, which is in turn replaced by signal 436 between SPU 16 and PLU 431. Typically the use of moving WMUs to relay data on a network will be limited to those high traffic times when local capacity is near its limits. Similarly, the system's route optimization calculation will be to a lower standard when a mobile relay unit participates in the relay of any data packets. Consequently, the dynamic assignment of grid cell numbers preferably involves the transient assumption of the most common grid cell number nearby.

Still referring to FIG. 4, at the beginning of communication (e.g., start of making a VoIP call) mobile SPU 16 identifies a suitable WMU with which to form a wireless link, then, for example, forms wireless link 406 with PLU 401. SPU 16 continuously identifies a (preferably the most) suitable WMU with which to form a wireless link before SPU 16 transmits each data packet. As SPU 16 moves along path 17, at some point, PLU 411 becomes the most suitable WMU with which to form a wireless connection so SPU 16 does form wireless connection 416 with PLU 411. Once SPU 16 recognizes that the WMU with which it has formed a wireless link has changed from PLU 401 to PLU 411, then SPU 16 sends a "location-update" data packet to PLU 401. The location-update packet includes (but is not limited to) information about the new WMU—in this example PLU 411 and is sent via PLU 411, since PLU 401 may by this time be out of range of SPU 16. Upon receipt of the location-update packet, PLU 401 adds an entry (e.g., SPU 16 has formed a wireless link with PLU 411) to a relay table 450 in the on-board memory of non-mobile WMUs such as PLU 401. Any PLU 11 receiving data packets from mobile SPU 16 can determine if those data packets were sent through PLU 401 because the header of the data packets from mobile WMUs include information regarding any non-mobile WMU (in this example PLU 401) that directly relayed the data packet to and from mobile WMUs. So, to send data packets to SPU 16, first, the data packets are directed (in this example) to PLU 401. If SPU 16 is still within signal range of PLU 401, then PLU 401 sends these data packets directly to SPU 16. However, if SPU 16 is no longer within signal range of PLU 401, then PLU 401 selects a WMU from its on-board relay table (e.g., here PLU 401 may choose PLU 411) and relays the data packets destined for SPU 16 through PLU 411. However, if, before SPU 16 receives the subject data packet, SPU 16 has moved so far along path 17 that it is already also out of range of PLU 411, then PLU 411 too relays the data packet to a suitable WMU. For example, if SPU 16 has formed wireless link 426 with PLU 421 and sent its location-update packet to PLU 411, then PLU 411 may select PLU 421 from the updated relay table in the on-board memory of PLU 411. This type of relaying process (e.g., 401 to 411 to 421 to 431) is simply repeated and expanded along path 17 until each subject data packet reaches a WMU that currently has an active wireless link with SPU 16, over which link it is possible to deliver the packets directly to their destination. It is to be understood that as the hand-off takes place between relaying WMUs—PLU 401 is replaced by PLU 411, which is in turn replaced (in the mobile WMUs' table of directly reachable WMUs) by PLU 421 and so on . . . such that data packets may be relayed in both an efficient and reliable manner, since (for example) in most cases under normal operational conditions (even if the particular PLUs have sufficient transmitting power) it will no longer be of value to send packets via PLU 401 after it is known that mobile SPU 16 has reached (possibly in another cell) a location (whether on or off path 17) proximal PLU 431.

It is to be understood that whereas cell level routing tables maintain information about sub-paths within the same cell, this relay table is only for relaying or redirection and maintains transient information about non-mobile WMUs recently within communication range of mobile WMUs currently using the network. Advantageously, the relay table does not require current information, since non-mobile WMUs can redirect data packets using slightly out-dated information, such that there is a reduced chance of losing data packets. For example, when stationary PLU 401 receives a packet destined for mobile SPU 16, according to one embodiment of the system PLU 401 checks to determine if SPU 16 is within its signal range—if not, then PLU 401 uses the relay table to determine which WMU(s) can best be used to deliver the packet to SPU 16 (in this example PLU 411), and then PLU 401 uses the cell level routing table to locate and redirect the packet to PLU 411 for either delivery to SPU 16 or further relaying, for example, to PLU 421 or PLU 431. Even when mobile SPU 16 is not actively exchanging data payload packets with any other WMU 11, SPU 16 continues to identify suitable WMU 11 with which to connect and informs its DBU of any changes so that other WMUs can locate (for example) SPU 16 by querying the DBU. Mobile WMUs assign themselves a cell ID when they relay data, but they do not require a cell ID for sending or receiving data packets. Advantageously, an embodiment only adds one entry to one table so that updating is very fast and efficient. There is no need to send updated information to the other end of the communication path. If updated information must be sent to a WMU at the other end of the path, then the WMU at the other end temporarily continues to send data packets to the wrong relay or destination until the updated information reaches that WMU. Whereas others (including Ogier) have sought to ensure that no packets are mis-directed, disadvantageously the burden of overhead on the system always updating the path is worse than the cost of mis-direction. Advantageously, one of the present embodiments finds a better balance in that, for example, PLU 401 continues to receive packets destined for SPU 16 even after PLU 401 loses its connection with mobile SPU 16 since it has moved out of signal range. By continuing to send packets to PLU 401 it may take a few extra hops to reach SPU 16—however because of the simple and fast update of the method of one embodiment, there is far less chance of losing packets during the updating cycle. Advantageously, the resulting high reliability offsets the time or efficiency cost of any extra hops.

Finally, while it is clearly possible to use triangulation to locate mobile WMUs or other network nodes, advantageously one embodiment does not require that mobile SPUs be within the signal range of three stationary WMUs at any time.

According to one embodiment of the system, mobile WMUs may only need to calculate the path between non-mobile WMUs, similar to non-mobile WMUs calculating the path only within their own cell when mobile WMUs are relaying data packets, such that mobile units deal with fewer units during their less complex data route computation. There are various criteria for choosing between alternate paths, for example the number of hops.

Figure 5:
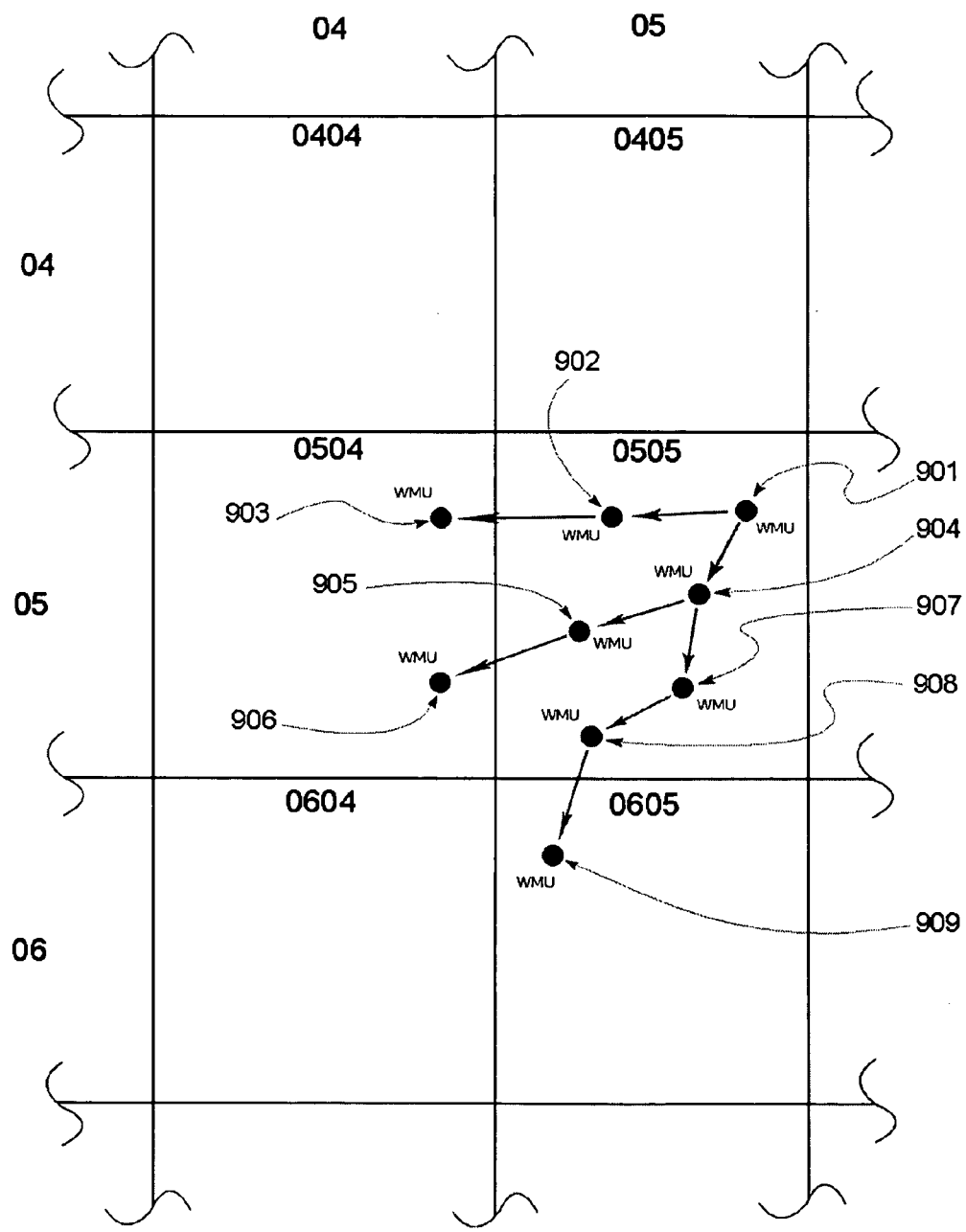
FIG. 5 illustrates how the system of one embodiment compares alternate data routes based on the number of hops.

According to FIG. 5, there is illustrated a WMU 901 shown in grid 0505, which sends a data packet to a destination unit in a far off grid cell number (not shown), say 1001. WMU 901 compares: 05<10 therefore 05+1=06 and 05>01 therefore 05−1=04. Such that WMU 901 determines that the first hop should be into either grid 0504 or grid 0605. WMU 901 could choose path 901-902-903, on the criteria that it has fewer hops (here 2) to reach a neighboring grid that is enroute to the destination grid cell number. However, if something happens, (e.g., WMU 902 becomes too busy to accept data) then WMU 901 could choose alternate path 901-904-905-906 because it has the next smallest number of hops. However, if something happens to both WMU 903 and WMU 906 in grid 0504 such that they both stop working, then WMU 901 could choose a path, such as 901-904-907-908-909 that does not pass through the disabled cell. This comparison process may take place in each cell as operational conditions change in the network.

Figure 6:
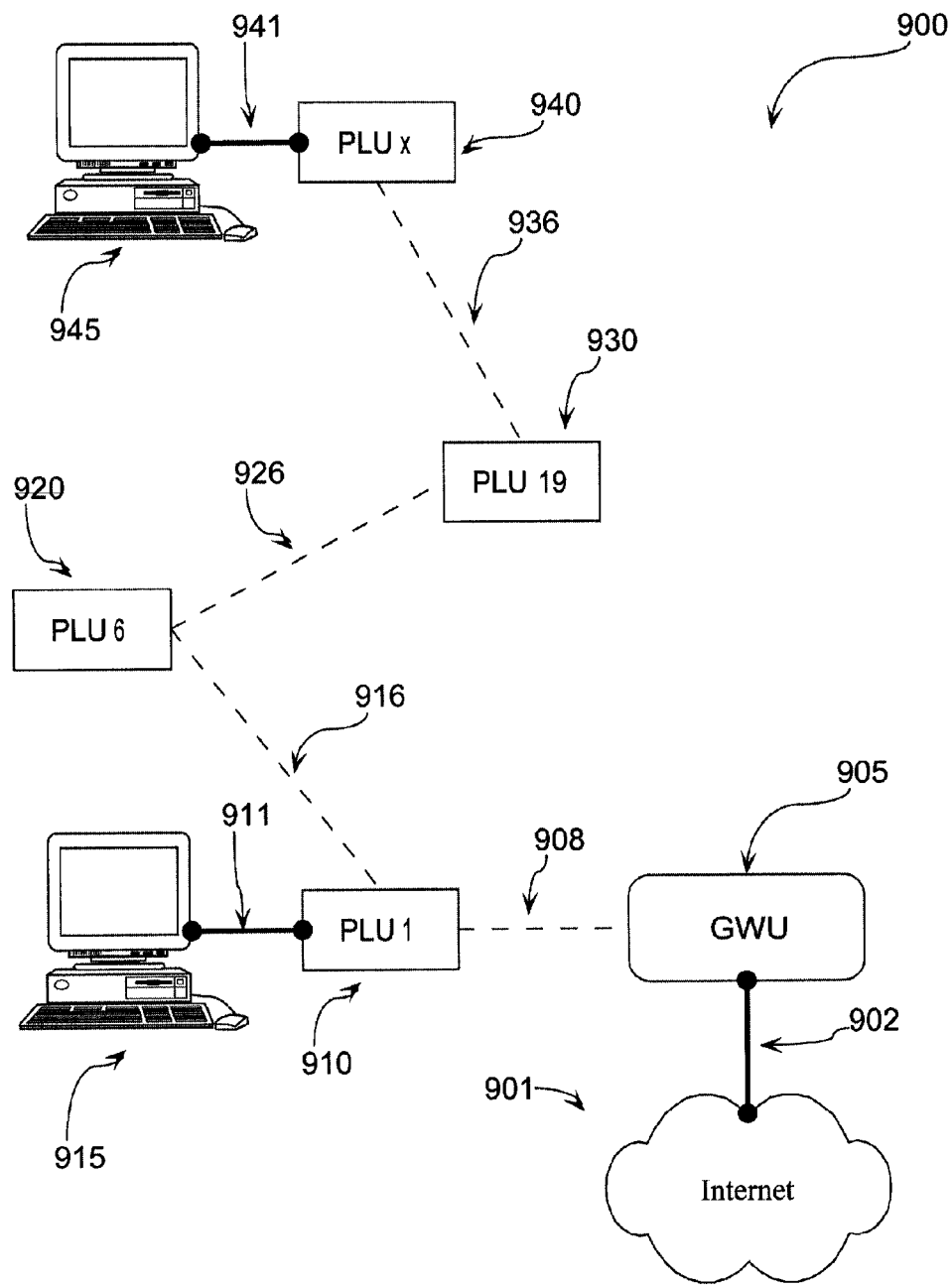
FIG. 6 illustrates a simple embodiment of the system based only on wireless communication between portable link units.
Figure 7:
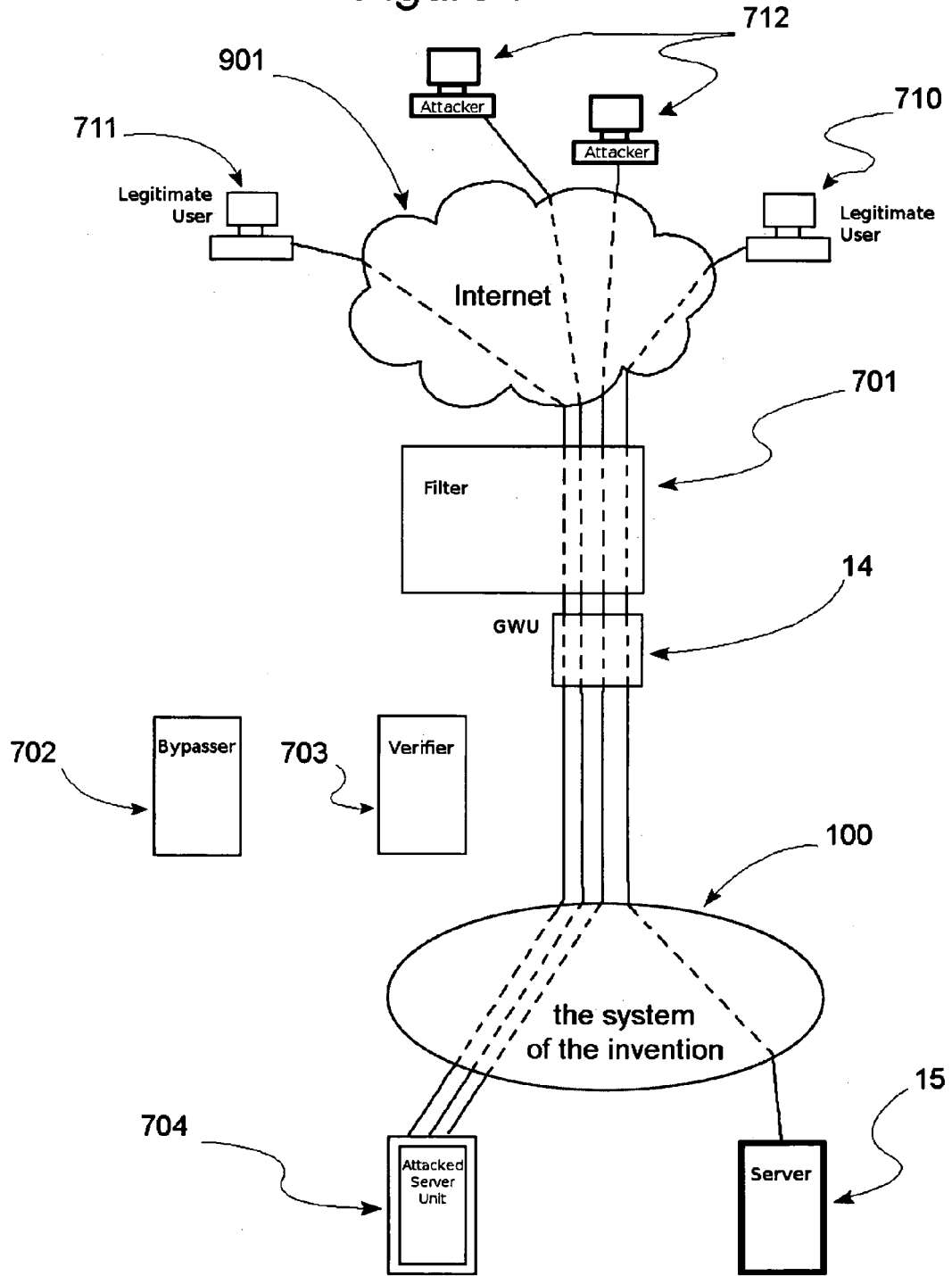
FIG. 7 illustrates a stage one of a server under attack, according to one embodiment.

According to FIG. 6, there is illustrated a simple embodiment denoted 900 of the system based only on wireless communication between PLUs. The Internet 901 is accessed by any suitable means (e.g., OC-48, T1) here illustrated as cable 902. A network operator installs GWU 905 for the purpose of distributing services to members, here exemplified by a number "x" of PLUs installed, for example, in various residences located throughout a typical subdivision having many homes in close proximity to one another. Assuming that x is some number larger than 19, say 24, there would be 24 PLUs located in a subdivision of say 100 homes, some of which are within direct wireless range of each other (e.g., PLU 1 and PLU 6) but others of which are too far distant from one another (e.g., PLU 1 and PLU 19 or PLU x) such that they must communicate through units that are closer. GWU 905 may be wirelessly in contact with more than 1 PLU, but for simplicity here we assume that GWU 905 communicates only with unit 910 via wireless link 908. Unit 910 is connected (here shown via cable 911) by any suitable means to PC 915 in order to permit it to access Internet 901. According to the system of one embodiment, PC 915 has no other connection to Internet 901. Unit 910 wirelessly connects to any number of other PLU's within its wireless range via a wireless link such as link 916 to unit 920 as shown. Unit 920 may be in a home where its PC (not shown) is switched off, but unit 920 continues to act as a node on network 900 to send and receive data over links 916 and 926 between unit 910 and another unit 930 that could, for example, be temporarily installed on a lamp post in the subdivision by the network operator to fill a "blind spot" in system 900 until enough subscribers nearby that location are maintaining PLUs capable of relaying a signal such as link 936 to reach remotely located unit 940. When the remote user of PC 945 involves access to Internet 901 she connects through cable 941 to unit 940 and her data packets are relayed through units 930, 920, and 910 to GWU 905 where all of her Internet traffic flows. It is understood that GWU 905 could be replaced with various other forms of WMU, such as a database, to provide billing, security, virus control and other valuable services that enhance her local communication experience.

In order to deploy the system of one embodiment as an operational network, PLUs may be rented or sold to individuals or organizations who wish to subscribe as members to a wireless network. Those PLUs will be located at subscribers' residences or offices over a wide area and thereby form the base network. Subscribers typically connect a personal computer to a PLU and any user wishing to access the network outside of his/her residence may also rent or buy a PPU permitting them to use a device such as laptop computer to access the network anywhere within the signal coverage area. Furthermore, by using a technology such as VoIP, a cell phone like SPU can operate as a mobile phone anywhere within the coverage area.

PPUs and SPUs proximal one another can already directly exchange signals with other similar WMUs without passing their data through this new network, but by using the network of one embodiment they can now also relay their data enroute, while sharing in the workload of WMUs nearby—advantageously making this network even more efficient.

Advantageously, since wireless routers of 100+mbps (mega bits per second) capacity are already on the market, subscribers to a network based on the system of one embodiment can enjoy wired Internet backbone grade speed with the mobility of a wireless connection.

Advantageously, the SUs of one embodiment permit great freedom of location to a data center because SUs can be placed anywhere in the large-scale wireless network coverage area without any physical connection to the Internet backbone. Also, because there is no need to install or use wire between a data center and Internet backbone, the total cost of a data center is reduced. The large-scale wireless network may also need its own data centers for stationary units. Those data centers can be leased to third parties for locating their servers; thus covering the cost of maintaining a data center.

Security is a further advantage of the system of one embodiment. Security measures are implemented before deploying the large scale wireless communications network of one embodiment in order to provide a secure online environment. Authenticity keys may be updated periodically, but this is rarely necessary. Using less routing information available at each hop may tend to disclose less to a given attacker, and local nodes are supplied with destination information, but they need not store the entire path. However, since each packet typically includes the source unit ID and destination unit ID, which attackers can read, it is prudent to include the below described features when operating one or more embodiments.

Another aspect of one embodiment is its security. According to one embodiment, to secure a large-scale wireless network, each member unit is verified, thereby authenticating its legitimacy, before it is permitted access to the network. Verification comprises the following steps:

1) when a WMU connects whether at the time it is powered on or first enters a coverage area (while already powered on) in the network, the connecting WMU sends out a signal including its unique unit ID (a set of bits with a pattern generated by an algorithm embedded during the manufacturing process);
2) one or more WMUs (depending on local network topology) will receive the connecting WMU's signal and check the legitimacy of that unit ID by any suitable means;

3) if the unit ID is not legitimate, then those WMUs already on the network send the connecting WMU a command to terminate transmission;
4) if the unit ID is confirmed legitimate, then those WMUs already on the network confirm other status information (e.g., credit standing, reported stolen, network abuser) associated with the unit ID of the connecting WMU in a database (any portion of which may be stored on any WMU, and maintained by a system administrator);
5) if the network access status check fails, then those WMUs already on the network send the connecting WMU a command to terminate transmission; and
6) if the network access status check is passed, then those WMUs already on the network send the connecting WMU further information (e.g., authenticity key, network status, network topology) useful to communicate with other WMUs. However, any WMU may also be configured to restrict access to itself by any other legitimate and authorized WMU.

Also, because each signal is sent in all directions, enabling anyone inside the maximum signal transmission range to receive and read network data, encryption is prudent. Secure data transmission comprises the following steps:
1) a given WMU receives data from a device (e.g., a personal computer) to which it is connected, then checks its legitimacy (e.g., source IP address belongs to an authorized sending device);
2) if the data is not legitimate, then the WMU deletes the data;
3) if the data is confirmed legitimate, then the WMU encrypts that data using a current authenticity key;
4) the WMU then adds (to the encrypted data) a "relay layer" including the source and destination unit ID and grid cell number;
5) the WMU then transmits the data to its destination over the network following the within novel method for distributing routing computational work while relaying packets;
6) when the data is received by the destination WMU, it removes the relay layer of step 4;
7) the destination WMU decrypts the data; and the data is processed accordingly.

Advantageously, the above data legitimacy check is also very effective shielding devices on the wireless network of one embodiment against a DoS (Denial of Service) attack because the data packets assembled for DoS attacks typically use a forged source address, which packets will be immediately deleted by each WMU invited to relay them over their region of the network. Therefore, any device connected to any WMU will not send data packets assembled for a typical DoS attack. Moreover, when any server within the wireless network of one embodiment has been targeted by a DoS attack from an external network, a network administrator can block data transmission, to the WMU being DoS attacked, at member gateway units. Although this feature prevents legitimate external users from accessing a DoS attacked member server, all member devices of the wireless network remain able to access the DoS attacked member server.

Since the network of one embodiment cannot check for forging of an external source address, when a member server is attacked, all packets directed to the attacked server are stopped at GWU, which also prevents legitimate external users from accessing the DoS attacked member server. Consequently, as set out in FIGS. 7-10, the system of one embodiment filters out packets assembled for DoS attack, in order that legitimate external users can resume accessing the attacked server.

Figure 8:
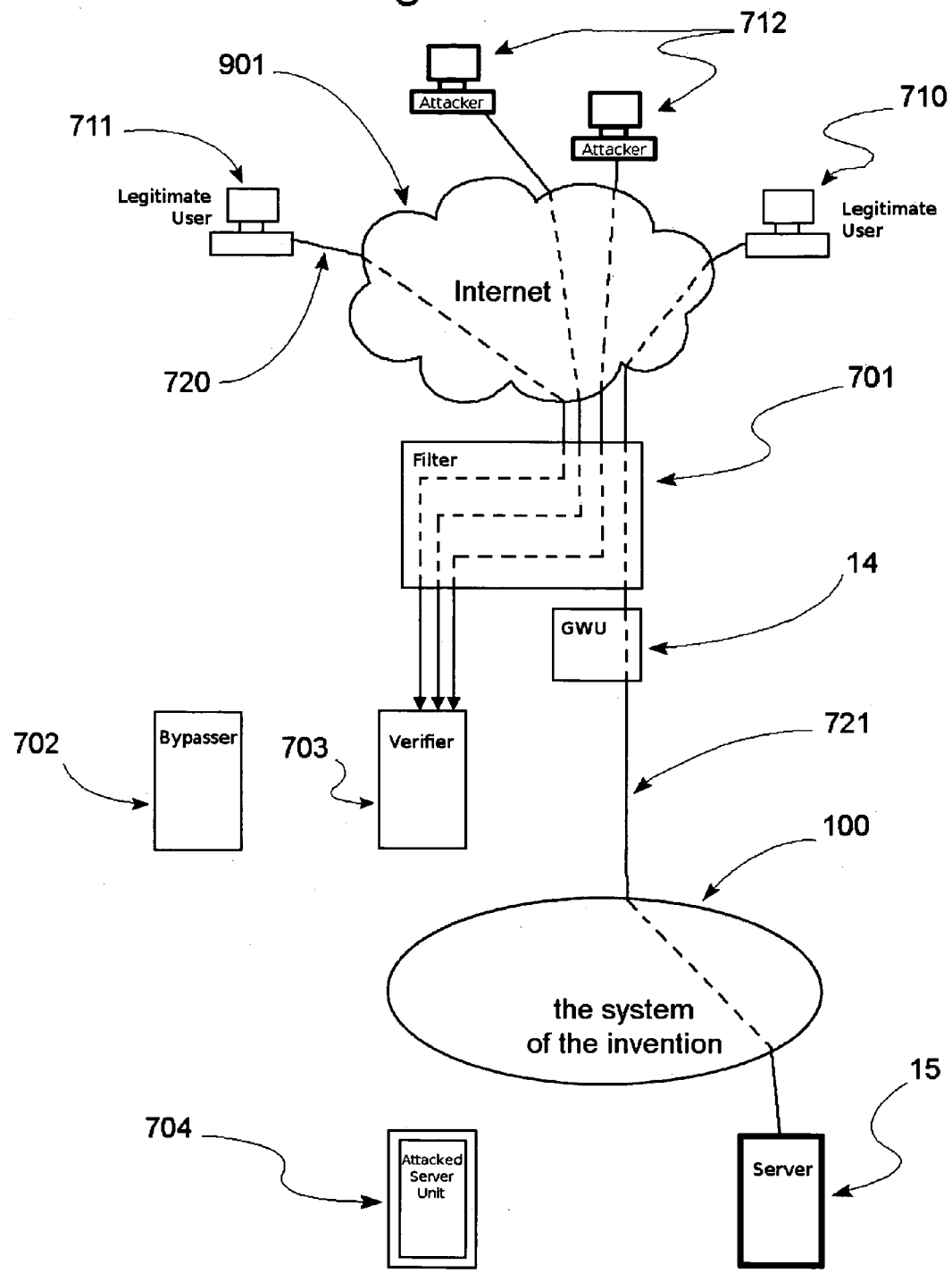
FIG. 8 illustrates a next stage of defending a server under attack, according to one embodiment.
Figure 9:
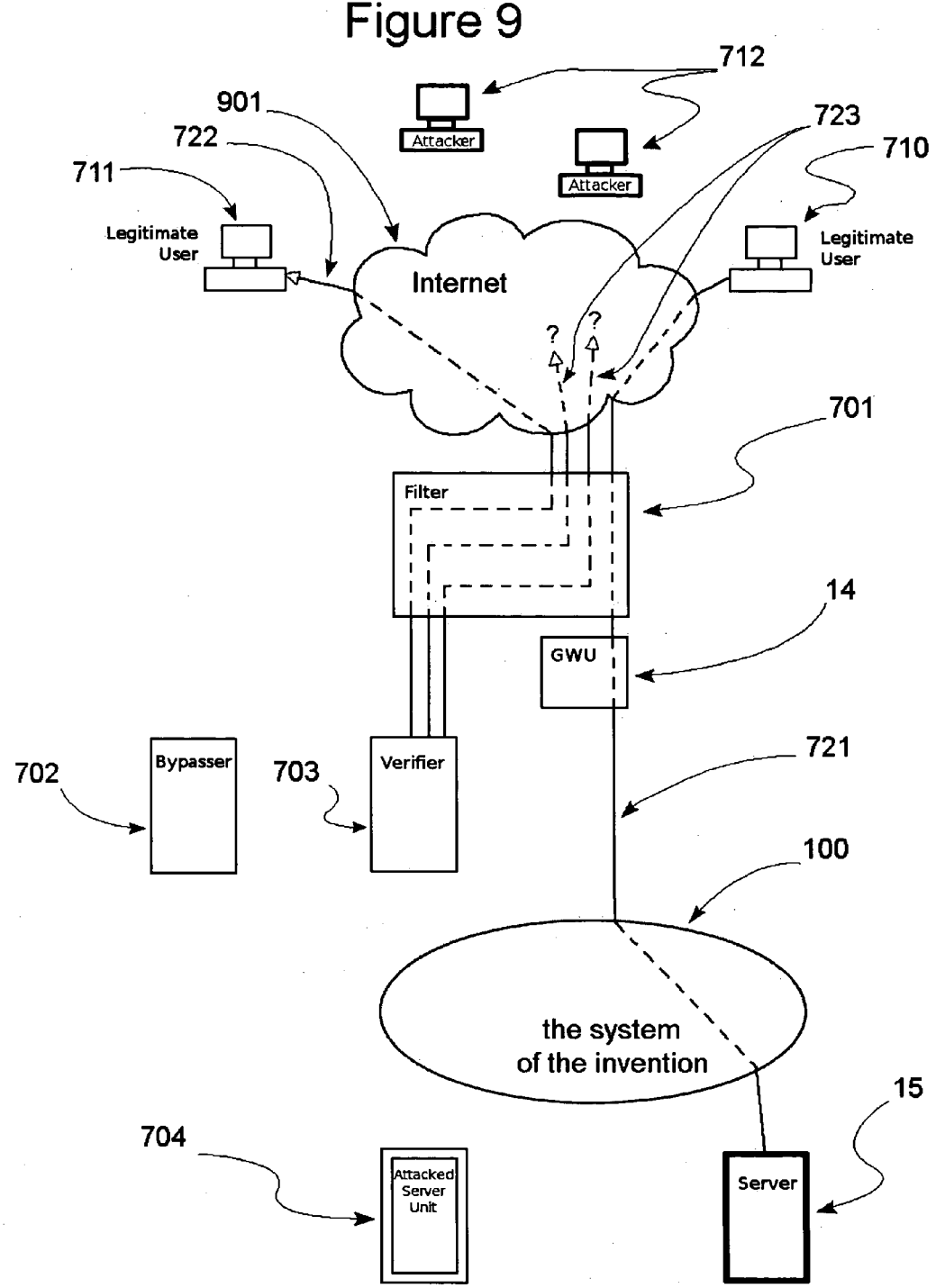
FIG. 9 illustrates a next stage of defending a server under attack, according to one embodiment.

According to FIGS. 7 through 10 inclusive there is illustrated an attacked server unit 704 (connected to system 100) in response to which attack in progress a filter 701 (e.g., a router with special programming) is activated to re-route (as shown in FIG. 8) all packets (being directed by attacker 712 over Internet 901 to attacked server 704) to verifier 703 that replies to all SYN packets 720 (a packet SYN flag is on or 1, similarly an ACK packet flag is on or 1) by sending back ACK/SYN packet 722 (as shown in FIG. 9) in reply. The verifier is effectively a router (thus will not open a half-open connection) having special programming and will not wait for a reply, such that the verifier remains responsive & functional, despite that it receives the same number of packets as the server under attack, which server becomes disabled or overwhelmed by a DoS attack.

Figure 10:
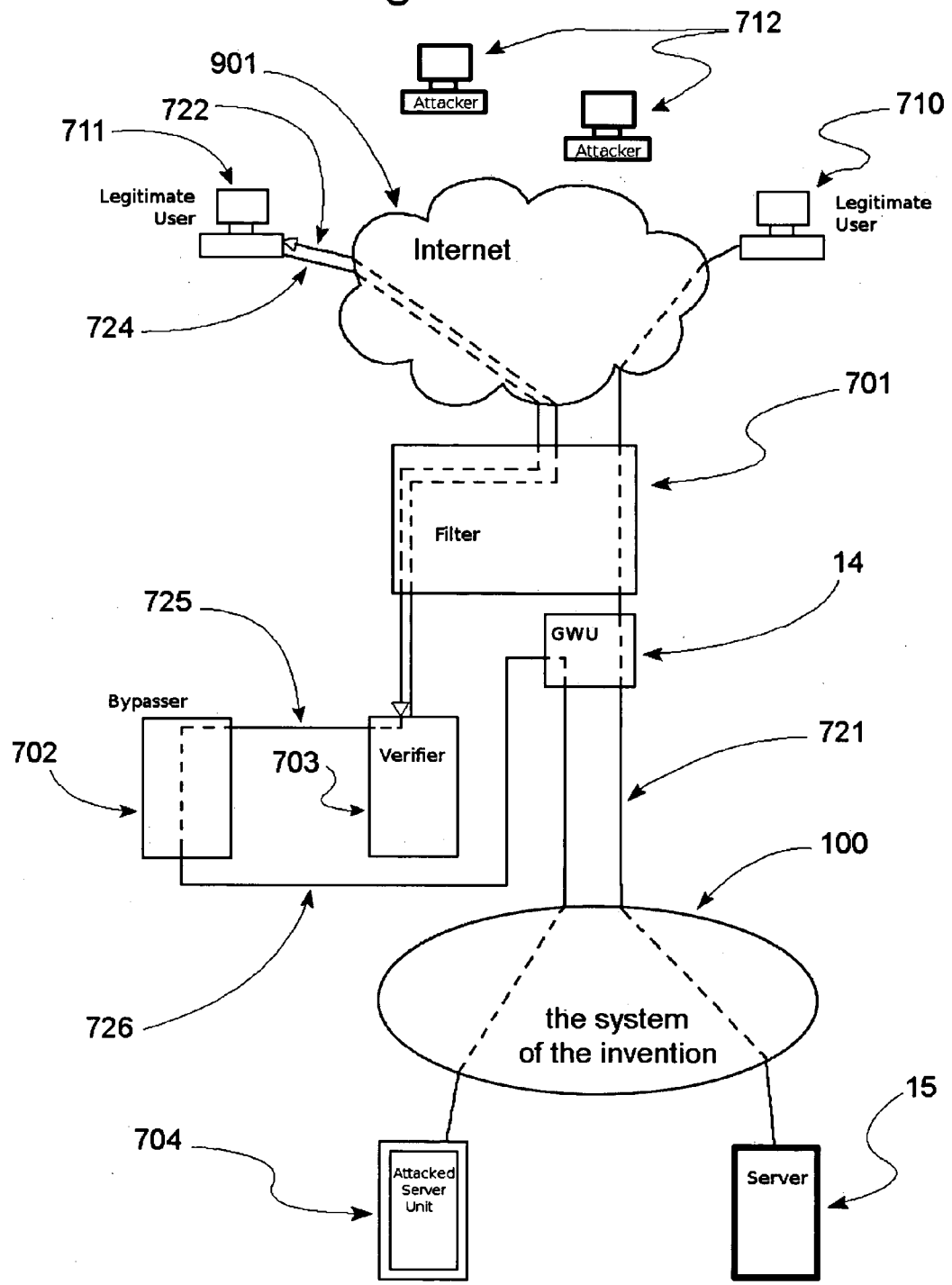
FIG. 10 illustrates the final stage of a server under attack being bypassed, according to one embodiment.

A SYN/ACK packet is a packet in which both SYN and ACK flags are on or 1. A server not under attack (shown as server 15) will also open a connection for an SYN sending node (a conventional server is programmed to open a connection in response to a SYN packet a.k.a. a "half-open" connection), but verifier 703 will not. Legitimate user device 711 will return ACK packet 724 (as shown in FIG. 10) in reply to an ACK/SYN packet 722, but attacker 712 cannot reply (leading to broken connections 723) to ACK/SYN packet 722, which has been sent to the forged address used by attacker 712. When verifier 703 receives ACK packet 724, verifier 703 redirects its packet over connection 725 to bypasser 702 that connects legitimate user device 711 to attacked server 704. Bypasser 702 acts like a sort of "middle man" to handle data packets. Server unit 15 not under attack can work through the above described process to connect over regular connection 721 to another device such as legitimate user 710. Bypasser 702 responds to ACK packet 724 and opens a connection 726 (shown connecting to gateway 14) without needing filter 701 to communicate with attacked server 704 normally. Subsequent data packets move through bypasser 702 because 2 nodes (e.g., attacked server 704 and legitimate user device 711) have opened a connection with bypasser 702 that connects only legitimate user devices 711 to attacked server 704. Typically when a server replies to a SYN packet 720, the server will wait for a reply. On average, the server will receive such reply in 0.1 seconds. However, since there will be no reply from attacker 712, the attacked server 704 will have to wait an extended period of time for a reply. During this waiting period, attacked server 704 reserves half-open connections for attacker 712, maintaining which open connections consumes the resources of server 704, such that, eventually, server 704 cannot open more connections and it becomes unresponsive to network users—resulting in a denial of service. Advantageously, verifier 703 is like a router which is not programmed to open a half-open connection and wait for a reply, so it remains responsive, despite that it receives the same number of packets as attacked server 704 as same as that a server is knocked down by a DoS attack but a router remains functional.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

Although the disclosure describes and illustrates certain embodiments, it is to be understood that these particular embodiments are not limiting. Many variations and modifications can occur. For full definition of the scope of the invention, reference is to be made to the appended claims.

What is claimed is:

1. A method of relaying data, for use with a wireless network having a grid of cells, while reducing the computational work load of each wireless member unit (WMU) in a given cell with respect to a path between an originating WMU and a destination WMU, the method comprising:
    querying other available WMUs within signal range to acquire cell identification data of each other available WMU within signal range in the grid of cells, wherein the grid of cells is an ordered set of cells and each cell within the grid of cells has a multi-dimensional geographical shape;
    completing calculations, based on the acquired cell identification data, to create a cell level routing table based on those portions of said path that are within said cell; and
    relaying the data toward the destination WMU using said routing table to deliver said data to a first WMU on the path, the first WMU selected based on defined criteria for reducing the computational work load of each WMU in the given cell with respect to the path.

2. A wireless system for transferring data packets along a path through a network coverage area having a grid of cells in which member devices are located, the system comprising:
    a plurality of portable link units (PLUs) to receive and send data between said member devices;
    at least one database unit (DBU) to store and then to deliver cell identification data to said member devices upon their request wherein the grid of cell is an ordered set of cells and each cell within the grid of cells has a multi-dimensional geographical shape; and
    programming means for reducing computational work load with respect to said path by restricting a routing calculation to a local portion of said path based on consideration of a location of those member devices within a same cell, so as to limit a size of the routing table shared by member devices within that cell.

3. The system as claimed in claim 2, further comprising at least one gateway unit (GWU) to exchange data with external networks.

4. The system as claimed in claim 3, further comprising at least one server unit (SU) for high capacity data transfer across the network coverage area.

5. The system as claimed in claim 4 further comprising at least one fixed link unit (FLU) for long distance connection across the network coverage area.

6. The system as claimed in claim 5, further comprising at least one peripheral peer unit (PPU), for use with connecting laptop computing devices to the system.

7. The system as claimed in claim 6, further comprising at least one mobile stand-along peer unit (SPU).

8. The system as claimed in claim 7 wherein said SPU is enabled to relay data throughout the network coverage area.

9. The system as claimed in claim 6 wherein said PPU is enabled to relay data throughout the network coverage area.

10. A method of enabling operation of a large-scale wireless communication network serving a network coverage area, to permit exchange of data packets between member devices, the method comprising:
    defining a grid of cells in relation to said network coverage area, wherein the grid of cells is a an ordered set of cells and each cell within the grid of cells has a multi-dimensional geographical shape;
    position a plurality of portable link units (PLUs) within said grid, each PLU being operably coupled to a member device located within a cell and a signal transmission range of at least one other PLU;
    locating at least one wireless member unit (WMU) within said grid, to enable access to external sources of data;
    assigning a cell identification number to each WMU within said grid; and
    initiate communication between said at least one WMU to create a cell level routing table of information with respect to active links available to each member unit, to determine possible paths over which to route data packets within the grid.

11. A method of decreasing burden of computation of data travel paths by individual wireless member units by distributing routing computations between the wireless member units of a large-scale wireless communication network that serves a network coverage area defined as cells of a grid, the method comprising:
    a) querying available wireless member units within direct signal transmission range of a current source unit and storing resulting network topology information onboard the current source unit, to enable reuse and share of said information;
    b) comparing and ranking said available wireless member units, based on performance criteria, and computing only that part of a total data path route that falls within those cells neighboring a cell of the current source unit, the cells neighboring the cell of the current source unit being within the grid of the cells, and the grid of cells being an ordered set of cells and each cell within the grid of cells having a multi-dimensional geographical shape;
    c) determining a grid direction for transmission from the current source unit to a destination unit;
    d) transmitting a data packet from the current source unit in the determined direction; and
    e) repeating c) and d), and additionally repeating a) and b) if there is a network topology change detected in the network coverage area.

12. A method for a mobile wireless member unit (WMU) maintaining communication with a destination node while switching relay nodes, the method comprising:
    detecting when a next-hop non-mobile WMU from the mobile WMU has changed from a first next-hop non-mobile WMU to a second next-hop non-mobile WMU;
    sending a location-update data packet, including a unit ID of the second non-mobile WMU, to the first non-mobile WMU;
    establishing a temporary path including the second non-mobile WMU through which to relay packets by adding a unit ID of the second non-mobile WMU to a relay table of the first non-mobile WMU; and
    relaying future data packets through the temporary path until a source WMU is informed of the change from the first next-hop non-mobile WMU to the second next-hop non-mobile WMU.

13. A non-mobile wireless member device within a system for transferring data packets along a path through a network coverage area having a grid of cells in which the member devices are located, the system comprising:
    a plurality of portable link units (PLUs) to receive and send data between said member devices;
    at least one database unit (DBU) to store and then to deliver cell identification data to said member devices upon their request, wherein the grid of cells is an ordered set of cells and each cell within the grid of cells has a multi-dimensional geographical shape; and
    programming means for reducing computational work load with respect to said path by restricting a routing calculation to a local portion of said path based on consideration of a location of those member devices within a same cell, so as to limit a size of the routing table shared by member devices within the same cell, the non-mobile wireless member device comprising:

at least one multi-sectored directional antenna or array communicably coupled to said non-mobile wireless member device; and at least one transceiver operably coupled to said directional antenna or array and to a processor of the non-mobile wireless member device.

14. A non-mobile wireless member device within a system for transferring data packets along a path through a network coverage area having a grid of cells in which the member devices are located, the system comprising:

a plurality of portable link units (PLUs) to receive and send data between said member devices;

at least one database unit (DBU) to store and then to deliver cell identification data to said member devices upon their request, wherein the grid of cells is an ordered set of cells and each cell within the grid of cells has a multi-dimensional geographical shape; and programming means for reducing computational work load with respect to said path by restricting a routing calculation to a local portion of said path based on consideration of a location of those member devices within a same cell, so as to limit a size of the routing table shared by member devices within the same cell, the non-mobile wireless member device comprising:

at least one 3 sectored directional antenna or array communicably coupled to said non-mobile wireless member device;

at least one transceiver operably coupled to said directional antenna or array and to a processor of the non-mobile wireless member device; and means for adjusting electro-physical characteristics of said directional antenna or array, in order to control lobe shape.

15. A non-mobile wireless member device within a system for transferring data packets along a path through a network coverage area having a grid of cells in which the member devices are located, the system comprising:

a plurality of portable link units (PLUs) to receive and send data between said member devices;

at least one database unit (DBU) to store and then to deliver cell identification data to said member devices upon their request, wherein the grid of cells is an ordered set of cells and each cell within the grid of cells has a multi-dimensional geographical shape; and programming means for reducing computational work load with respect to said path by restricting a routing calculation to a local portion of said path based on consideration of a location of those member devices within a same cell, so as to limit a size of the routing table shared by member devices within the same cell, the non-mobile wireless member device comprising:

at least one 6 sectored directional antenna or array communicably coupled to said non-mobile wireless member device;

at least one transceiver operably coupled to said directional antenna or array and to a processor of the non-mobile wireless member device; and means for adjusting electro-physical characteristics of each said directional antenna or array, in order to control lobe shape.

16. A non-mobile wireless member device within a system for transferring data packets along a path through a network coverage area having a grid of cells in which the member devices are located, the system comprising:

a plurality of portable link units (PLUs) to receive and send data between said member devices;

at least one database unit (DBU) to store and then to deliver cell identification data to said member devices upon their request, wherein the grid of cells is an ordered set of cells and each cell within the grid of cells has a multi-dimensional geographical shape; and programming means for reducing computational work load with respect to said path by restricting a routing calculation to a local portion of said path based on consideration of a location of those member devices within a same cell, so as to limit a size of the routing table shared by member devices within the same cell, the non-mobile wireless member device comprising:

an omni-directional antenna communicably coupled to the non-mobile wireless member device; and an adjustable transceiver operably coupled to said antenna and to a processor of the non-mobile wireless member device.

17. A method of reducing the number of house-keeping packets sent to wireless member units (WMUs) within a system for transferring data packets along a path through a network coverage area having a grid of cells in which the member devices are located, the method comprising:

providing a plurality of portable link units (PLUs) to receive and send data between said member devices;

providing at least one database unit (DBU) to store and then to deliver cell identification data to said member devices upon their request, wherein the grid of cells is an ordered set of cells and each cell within the grid of cells has a multi-dimensional geographical shape; and providing programming means for reducing computational work load with respect to said path by restricting a routing calculation to a local portion of said path based on consideration of a location of those member devices within a same cell, so as to limit a size of the routing table shared by member devices within the same cell, the method for use with the system and further comprising:

enabling the at least one of the member devices to receive at least one mis-directed data packet;

enabling the at least one of the member devices to read a header of said mis-directed data packet;

enabling the at least one of the member devices to update a local or cell level routing table with respect to available status of a sending WMU; and enabling the at least one of the member devices to delete said mis-directed data packet.

* * * * *